Nov. 11, 1930.    W. D. DOBSON    1,781,275
GEARING FOR MACHINES
Filed Oct. 1, 1929    2 Sheets-Sheet 1

INVENTOR
WILLIAM D. DOBSON
BY John A. Bronnhardt
ATTORNEY

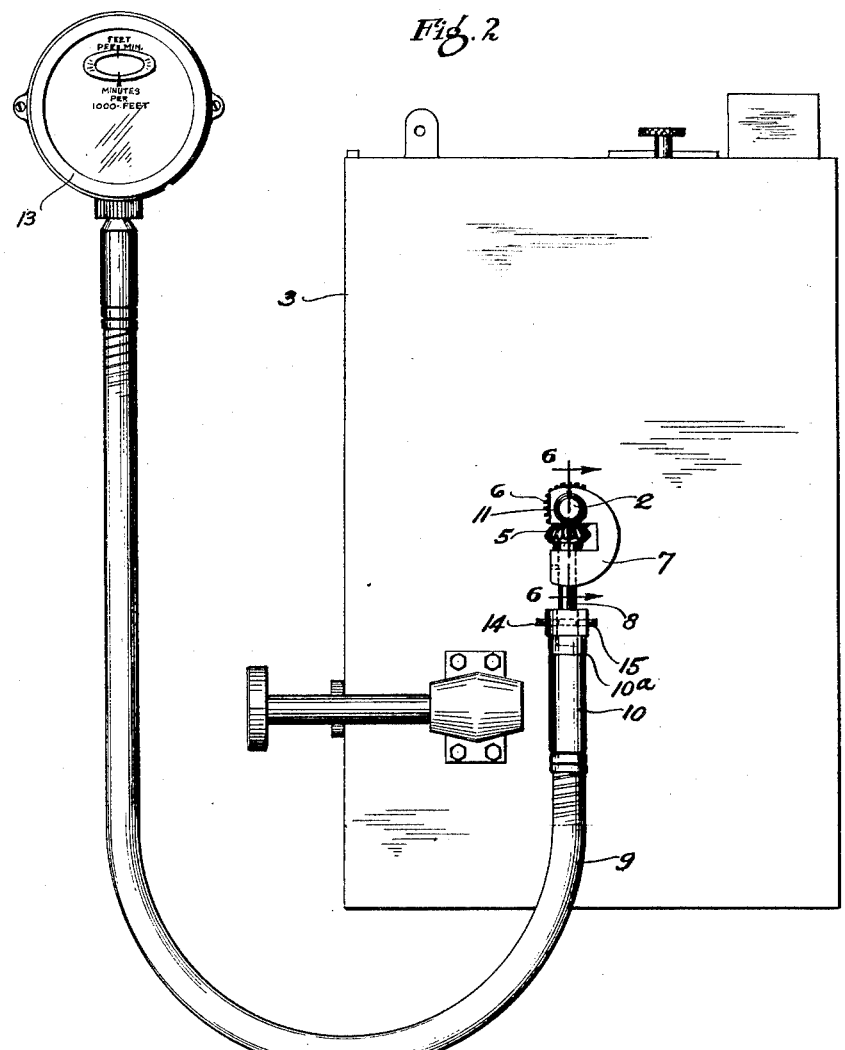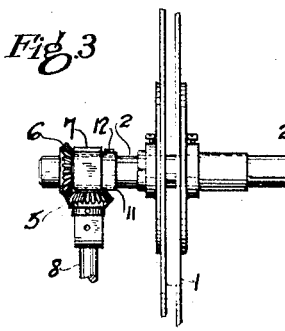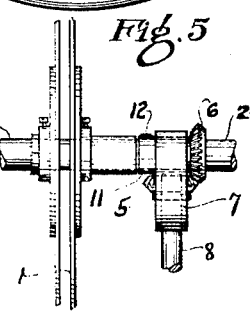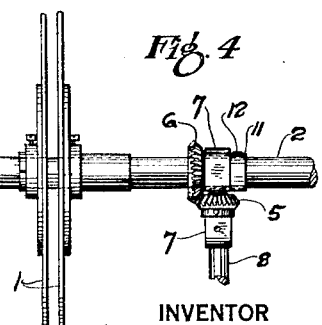

Patented Nov. 11, 1930

1,781,275

UNITED STATES PATENT OFFICE

WILLIAM D. DOBSON, OF CLEVELAND, OHIO

GEARING FOR MACHINES

Application filed October 1, 1929. Serial No. 396,453.

This invention relates to gearing for machines and especially to the driving of the speed indicator from the shutter shaft which registers the amount of film passing through the projector of motion picture machines.

At present there are two magnetic speed indicator heads in use, the magnet in each one traveling in opposite directions. The reason that two speed indicator heads have to be made is, that different projector shutter shafts have a different direction of rotation.

A decided advantage in my invention is that one of these two speed indicator heads may be eliminated, as to get the opposite direction of rotation, all that is necessary is to reverse the attachment on the shutter shaft. This invention affords three places in which the cable can be attached to the shutter shaft, either in front of the shutter, or behind the shutter and it can also be used with a rear shutter. The attachment just slides on the shutter shaft and is made fast by a set screw.

Thus one of the objects of the invention is to provide a means whereby the same speedometer head may be used.

Another important object is to simplify the process of reversing the direction of rotation.

Figure 1:
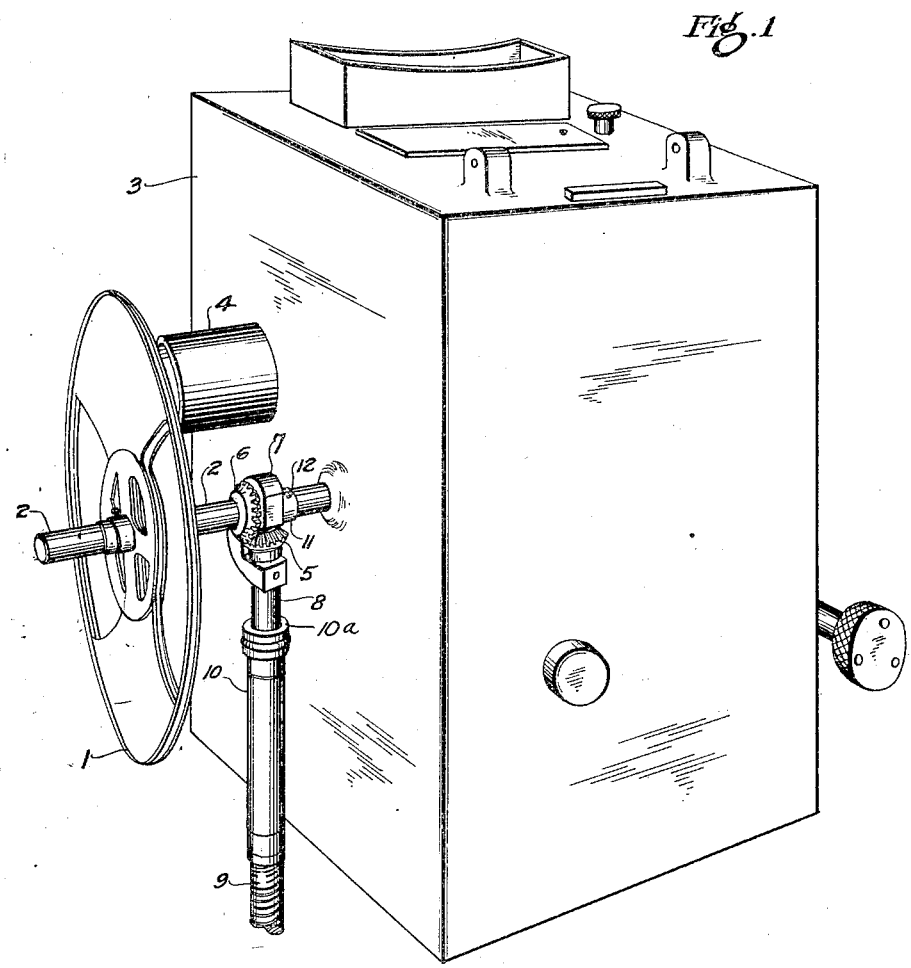
Figure 6:
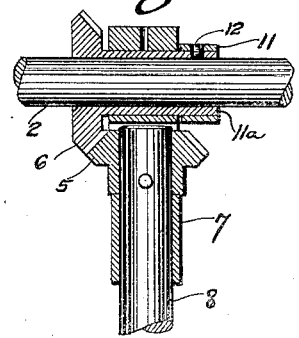

Other objects of the invention will be apparent from the following description and the accompanying drawings in which:

Figure 1 is a perspective view of a projector embodying the invention; Fig. 2 is a side elevation of the projector embodying the invention in relation to the speedometer; Fig. 3 is a partial view showing the driving mechanism clamped on the shaft in front of the shutter; Fig. 4 is a view showing the driving mechanism clamped on the shaft between the shutter and the projector; and Fig. 5 is a view similar to Fig. 4 with the gearing in reversed position. Fig. 6 is a sectional view on line 6—6 of Fig. 2.

Referring specifically to the drawings, the shutter 1 is mounted for rotation concentrically with a shaft 2 which intersects the wall of the projector box 3 substantially at its center, and to one side of the projecting lens 4.

Figs. 1 and 5 show beveled gear 5 supported in position on shaft 2 and partially encased in the cut-out half circular bracket 7; through a bearing sleeve $11^a$ in the upper part of which bracket the shaft 2 extends; and from the lower end of which bracket projects the speedometer shaft 8. Upon the shaft 8 is mounted the gear 5, which is rotatably connected in the sleeve $10^a$ to flexible tube 9 by the rigid metal tube 10.

The speedometer shaft 8, bracket 7, gears 5 and 6 are set angularly with shaft 2 and are held in position by means of collar 11 and set screw 12, the speedometer shaft 8, on which the gear 5 is mounted, extending through the bracket 7.

When the bevel gear 5 meshes with similar gear 6, the rotation of shaft 2 drives the gears 5 and 6 causing the speed to register on the speedometer 13. To reverse the rotation, the bracket 7, bevel gears 5 and 6 and sleeve $11^a$ which form a complete unit, may be released by removing screw 12, and then released from shaft 2 by removing the shutter, and then placed back on shaft 2 in a reversed position and set screw tightened in position. This allows the rotation to be reversed without the necessity of a reverse speedometer rotation.

It will be noticed that the bracket 7 supports the sleeve $11^a$ on which the gear 6 is mounted and confined, but free to rotate in the bracket, so that the bracket supports or carries the gears 5 and 6 as a unit, which can be reversed on the shaft 2 to reverse the direction of rotation.

Altho shown in connection with a moving picture machine the gearing is capable of use in many other relations, where it is desired to couple shafts together by an attachment which can be readily reversed to reverse the direction of rotation when desired, and no limitation as to the use of the device is to be implied.

I claim:

A device for coupling angularly disposed shafts comprising a pair of shafts, a U-shaped bracket through one arm of which one shaft extends and through the other arm of which the other shaft extends at an angle thereto, a pair of beveled gears one of which has a bearing sleeve extending through one arm of the bracket and fixed to one shaft, and a removable collar on the end of the sleeve opposite said gear, and the other of which gears is fixed to the other shaft, said gears being supported by the bracket and removable therewith from the first mentioned shaft.

In testimony whereof, I do affix my signature.

WILLIAM D. DOBSON.